(12) United States Patent
Goldberg (10) Patent No.: US 6,457,468 B1
(45) Date of Patent: Oct. 1, 2002

(54) VERTICAL BLADE SAW ASSEMBLY FOR CERAMIC AND MASONRY MATERIALS

(76) Inventor: Nicolas Goldberg, 476 Paddy Hill Road, Moretown, VT (US) 05660

( * ) Notice: Subject to any disclaimer, the term of this patent is extended or adjusted under 35 U.S.C. 154(b) by 0 days.

(21) Appl. No.: 09/559,614

(22) Filed: Apr. 27, 2000

Related U.S. Application Data

(63) Continuation-in-part of application No. 09/429,105, filed on Oct. 28, 1999.

(51) Int. Cl.[7] .................................................. B28D 1/02
(52) U.S. Cl. ........................ 125/19; 125/12; 125/16.01; 125/18; 125/20; 83/170; 83/171; 83/783; 83/784; 83/785; 83/786
(58) Field of Search ............................... 125/12, 16.01, 125/18, 19, 22; 83/170, 171, 783, 784, 785, 786

(56) References Cited

U.S. PATENT DOCUMENTS

| | | | |
|---|---|---|---|
| 4,807,361 A | | 2/1989 | Raczkowski |
| 4,841,823 A | * | 6/1989 | Brundage ..................... 83/781 |
| 4,870,946 A | | 10/1989 | Long et al. |
| 5,016,512 A | * | 5/1991 | Huang ......................... 83/783 |
| 5,176,059 A | | 1/1993 | Anderson |
| 5,331,769 A | * | 7/1994 | Walton ....................... 451/249 |
| 5,662,017 A | * | 9/1997 | Mellon ......................... 83/169 |
| RE35,666 E | | 11/1997 | Smith |
| 5,964,039 A | * | 10/1999 | Mizoguchi et al. ............ 30/392 |
| 6,000,387 A | * | 12/1999 | Lee ......................... 125/13.01 |

OTHER PUBLICATIONS

Diamond Tech International, DL5000"Diamond Bladed Wet Band Saw", www.diamondsaws.com.
QEP Tiling Systems, Saber saw blade product packaging, Item No. 10014.
QEP, 6" Rod Saw product packaging, Item No. 10030.
QEP, 10" Hacksaw Blade product packaging, Item No. 10023.

* cited by examiner

*Primary Examiner*—M. Rachuba
*Assistant Examiner*—Shantese McDonald
(74) *Attorney, Agent, or Firm*—Hayes Soloway, P.C.

(57) ABSTRACT

The vertical blade saw assembly for ceramic and masonry materials is designed to provide an assembly that allows the user to make cuts of any shape to ceramic tiles and masonry materials in order to permit the installation of precision cuts for a particular setting. The assembly has an electric drive motor that is protected from the coolant used to keep the blade from overheating. The assembly has a plurality of parallel arms that are connected and permit the oscillating motion of the arms. The vertical blade is connected to the arms which place the blade in motion. The assembly has a base unit to provide support for the assembly. A coolant tray is positioned around the base unit. A water pump and accompanying tubing is used to circulate the coolant to the blade. Several cutting blades are also disclosed.

15 Claims, 8 Drawing Sheets

VERTICAL BLADE SAW ASSEMBLY FOR CERAMIC AND MASONRY MATERIALS

This patent application is a continuation-in-part of U.S. patent application Ser. No. 09/429,105 filed Oct. 28, 1999.

This invention pertains to vertical blade saws and, in particular, to a vertical blade saw assembly for ceramic and masonry materials that will allow the user to make precision cuts of any shape and keep the vertical blade within a desired temperature range to increase the life of the blade in these operations.

The use of vertical saws is well known and the use of coolants to maintain the life of a saw blade is also known. What has not been shown is a vertical reciprocating saw blade apparatus that is designed to provide precision cuts of any shape to ceramic and masonry materials that also incorporates a coolant for the vertical blade. For example, the U.S. Pat. No. 4,807,361 issued to Romuald Raczkowski on Feb. 28, 1989 for a "Cutting Blade Lubrication" and the U.S. Pat. No. 4,870,946 issued to Richard D. Long et al on Oct. 3, 1989 for a "Fluid Cooled Apparatus for Cutting Concrete Material and the Like" show devices that use blades for cutting and are cooled to maintain a desired temperature of the blade. What is needed is an assembly that will permit the cutting of precision cuts of any shape to ceramic and masonry and at the same time, allow the cutting blade to be cooled as the sawing process is underway. A diamond bladed wet band saw sold under the trade name Diamond Laser 5000 is available from Diamond Tech International. The drawback to this saw is that it has a continuous blade. This saw is incapable of doing inserts as will be explained below. The saw and the saw blade are also very expensive and replacing the blade is time consuming.

It is the object of this invention to teach a vertical blade saw assembly for ceramic and masonry materials which avoids the disadvantages and limitations, recited above in previous vertical blade assemblies. It is the object of this invention to provide an assembly that is inexpensive to manufacture, easy to use, and is extremely effective at making precision cuts of any shape.

SUMMARY OF THE INVENTION

Particularly, it is the object of this invention to teach a vertical blade saw assembly for ceramic and masonry materials, for use in providing precision cuts of any shape to tiles and the like, while keeping the blade making the cut within an ideal temperature range in order to prolong the life of the blade, comprising a housing for encompassing the entire assembly; said housing having a materials support platform for positioning the material to be cut; said housing having a plurality of blade attaching arms for holding a blade in the proper orientation; a vertical blade unit attached to said blade attaching arms for cutting the material; a coolant system for maintaining said blade at a desired temperature in order to prolong the operational life of said vertical blade unit; and a drive motor for operating said blade attaching arms and said vertical blade unit. Although the invention as described has application for cutting ceramic and masonry materials, the invention is also capable of cutting other similar materials such as glass, marble, and stone. Throughout this disclosure, it should be understood that any reference to tile, ceramic tile, or masonry means any material comprising but not limited to tile, ceramic tile, masonry, glass, brick, concrete, marble, and stone.

It is also the object of this invention to teach a vertical blade saw assembly for ceramic and masonry materials, for use in providing precision cuts of any shape to tiles and the like while keeping the blade making the cut within an ideal temperature range in order to prolong the life of the blade, comprising in combination a housing having a drive motor that powers a blade unit positioned between two parallel attachment arms having a pivot means in order to provide parallel, oscillating motion to the arms and the blade, said housing having a material support platform having an aperture therein for the passage of the blade and a coolant system for cooling the blade, said coolant system comprising a reservoir, tubing and a coolant pump, said reservoir being located below said material support platform.

BRIEF DESCRIPTION OF THE DRAWINGS

Further objects and features of the invention will become more apparent by reference to the following description taken in conjunction with the following figures, in which.

DETAILED DESCRIPTION OF THE PREFERRED EMBODIMENT

As shown in the figures, the novel vertical blade saw assembly 10 for ceramic and masonry materials comprises a vertically mounted, reciprocating blade 11 positioned in a housing 12 and tensioned through a work platform 13. The housing 12 comprising a unit of rigid construction. The housing 12 may comprise a unit of metallic construction or composite construction. The work platform or table 13 has an aperture 24 therein to allow the vertical blade 11 to be able to pass through the work platform or table 13. The standard use of the assembly is to make cuts of any shape to the tile 1. It can also be used so that the blade 11 can be inserted through a hole in the ceramic tile 1 placed over the aperture 24 in the work platform or table 13 and a hole of any shape can be made of the tile 1. The blade 11 is attached to two reciprocating blade arms 14 and 14a and locked into place by means of linking mechanisms 15 and 15a at the ends of the reciprocating blade arms 14 and 14a. The reciprocating blade arms are located in parallel to each other, one located above the other. A blade tensioning device 16 is located on top of the upper blade reciprocating arm 14 consists of a tightening knob which adjusts the proper tension that is kept on the blade 11.

A drive motor 17 is attached by mechanical linkages 18 to the two blade reciprocating arms 14 and 14*a* and imparts the reciprocating motion to the blade reciprocating arms 14 and 14*a* through pivot point 14*c* and through them to the vertical saw blade 11. The drive motor 17 is preferably less than 3 HP, more preferably ½ HP. A control switch 19 turns the motor on and off. The work platform or table 13 is supported by support pieces 20 and 20*a* and provides an area below the work platform that can house the drive motor 17 and the coolant reservoir 21. Coupled to the support pieces 20 and 20*a* and underlying reciprocating blade arms 14 and 14*a* may be a sloped diverter surface 30. The surface 30 urges coolant that drips of off the work platform or table 13 away from the motor 17 and into the coolant reservoir 21. The coolant reservoir 21 holds the fluids that help maintain the blade temperature in a desired range for extended life and optimum cutting capability. The coolant fluid is moved through tubing 22 to the blade 11 by means of a fluid pump 23. The fluid will then return to the reservoir 21 by means of gravity. The fluid pump is preferably less than 1 HP, more preferably ¹⁄₄₀ HP. The coolant fluid is preferably water. In operation, the user actuates the switch 19 which initiates the operation of the drive motor 17 and then in turn the reciprocation blade arms 14 and 14*a*, the blade 11 and the fluid pump 23. The tile 1 is then placed on the work platform or table 13. The user then manipulates the tile 1 as necessary in order to make precision cuts of any shape to the tile 1. The fluid pump 23 drives fluid through the fluid tube 22 to the blade area which sprays coolant on the blade 11. Then, by gravity, the fluid returns to the fluid reservoir 21. Therefore, what is described in operation is a tile saw assembly 10 having a vertically mounted reciprocating blade 11 tensioned through a work table 13. An electric motor 17 drives the blade 11 that is held in position by two mounting arms 14 and 14*a* having pivot points to provide reciprocal motion. The arms 14 and 14*a* are positioned one above the other and in parallel to each other. An electric pump 23 is used to circulate fluid to cool the blade 11. Precision cuts of any shape can be made. Additionally, installing the blade 11 through a hole in the tile allows cuts of any shape to be made in the interior of the tile 1.

Figure 4:
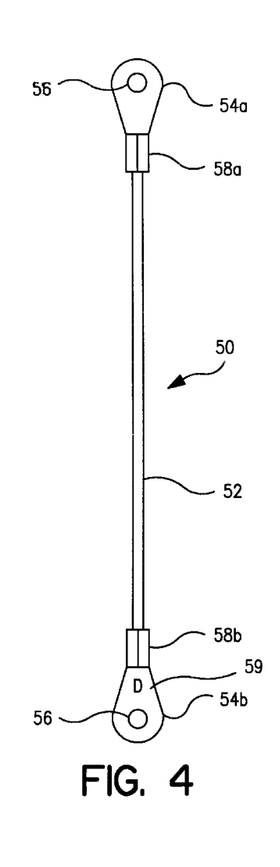
FIG. 4 is a side view of a first embodiment of a cutting blade according to the present invention.

FIG. 4 shows a blade 50 which is commonly referred to as a rod saw. The existence of rod saws is well known. The cutting surface of prior art rods saws is formed from Tungsten Carbide. The blade 50 is made from a length of wire 52 that has been coated with a diamond coating. Diamond has been chosen as a coating over Tungsten Carbide because diamond last considerably longer than the Tungsten Carbide. The blade length is preferably less than 12", more preferably 6" and the diameter is preferably less than ¼", more preferably ¹⁄₁₆". The blade 50 is most preferably sized similarly to the 6" rod saw from Q.E.P. Co., Inc. and sold as model number 10030. The rod saw from Q.E.P is made from Tungsten Carbide. The diamond coating in the present invention is deposited onto the wire 52 using conventional processes. In a preferred embodiment, the diamonds in the diamond coating will be directionally oriented to facilitate cutting predominantly in one direction. The preferred direction is during the downward stroke of the blade 50 when installed. This helps keep the tile 1 in contact with the work surface 13 and prevents chipping of the edge of the cut piece. The wire 52 is secured to end pieces 54*a* and 54*b* with a crimp 58*a* and 58*b*. An opening 56, preferably a circular hole, is formed in the end pieces 54*a* and 54*b* to allow the end pieces 54*a* and 54*b* to be secured to the reciprocating blade arms 14 and 14*a* and locked into place by means of the linking mechanism 15 and 15*a*. In a preferred embodiment, the end piece 54*b* will include an indicator 59, such as a symbol stamped into the end piece 54*b*, to signal the user that this end of the wire is the "downward" end. Alternatively, end piece 54*b* could be shaped differently than end piece 54*a* to signal the "downward" end to the user. A corresponding symbol can be shown on the reciprocating arm 14*a*.

Figure 5A:
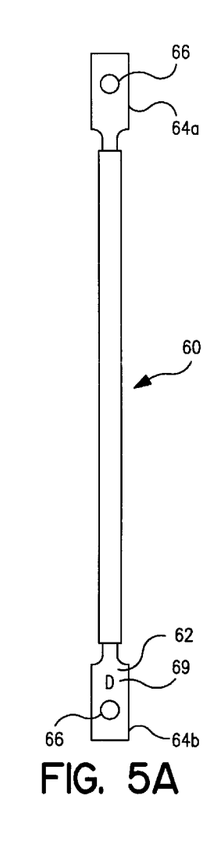
FIGS. 5A and 5B are a side view and a front view respectively of a second embodiment of a cutting blade according to the present invention.
Figure 5B:
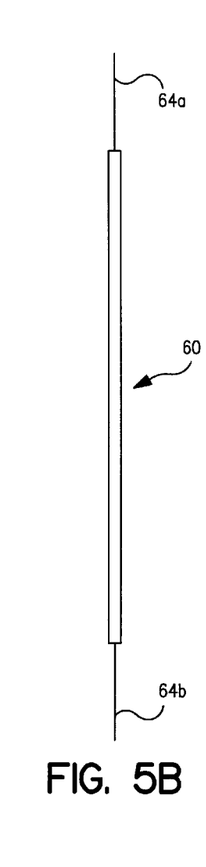

FIGS. 5A and 5B show a blade 60 for use in the present invention. The blade 60 is made from a stamped or formed piece of metal 62 that has been coated with a diamond coating along a substantial length of the metal piece 62. The cross section of the piece of metal 62 is preferably a rectangle. The dimensions are preferably 0.040" by 0.375". The diamond coating covers the two sides and the two edges. The blade length is preferably less than 12", more preferably 6" and the thickness is preferably less than ⅛", more preferably ¹⁄₁₆". In a preferred embodiment, the diamonds in the diamond coating will be directionally oriented to facilitate cutting predominantly in one direction. At each end of the metal piece 62 are end pieces 64*a* and 64*b*. An opening 66, preferably a circular hole, is formed in the end pieces 64*a* and 64*b* to allow the end pieces 64*a* and 64*b* to be secured to the reciprocating blade arms 14 and 14*a*.

Figure 6A:
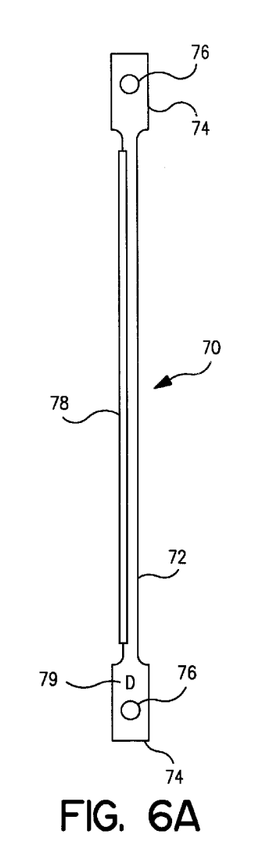
FIGS. 6A and 6B are a side view and a front view respectively of a third embodiment of a cutting blade according to the present invention.
Figure 6B:
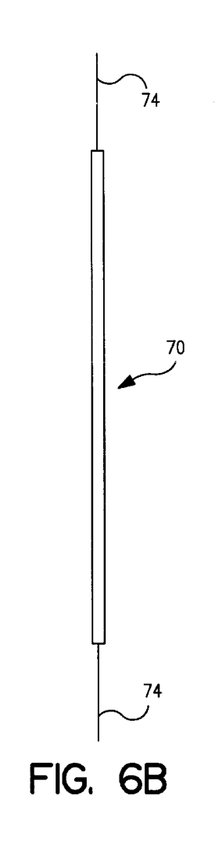

FIGS. 6A and 6B show a blade 70 for use in the present invention. The blade 70 is similar to the blade 60 shown in FIGS. 5A and 5B but only has the diamond coating on a leading edge 78. The blade 70 has the advantage of having a narrower trailing edge which allows the user to make tighter radius cuts than the blade 60 shown in FIGS. 5A and 5B and may provide improved directional stability. A blade with diamond coating on only one edge should also be less expensive to manufacture.

Varied sizes, shapes, and textures of diamond pieces can be deposited on to the blades 50, 60, or 70 to form different grit blades. Lower grit blades cut faster, but finer grit blades cut more smoothly. The design of the saw assembly 10 as shown in FIGS. 1, 2, and 3 allows for quick and easy changing of the blade 11 as the need arises.

Figure 1:
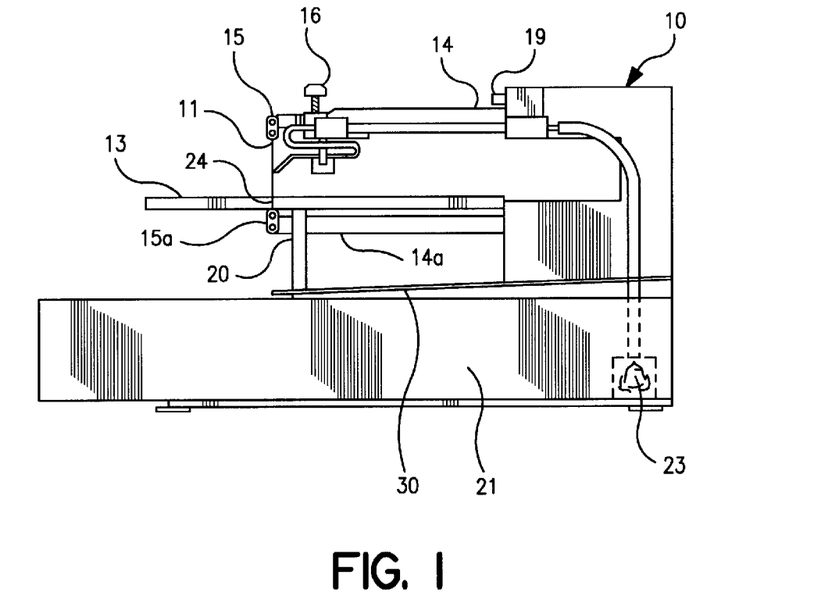
FIG. 1 is a side elevational view of the novel vertical blade saw assembly for ceramic and masonry.
Figure 2:
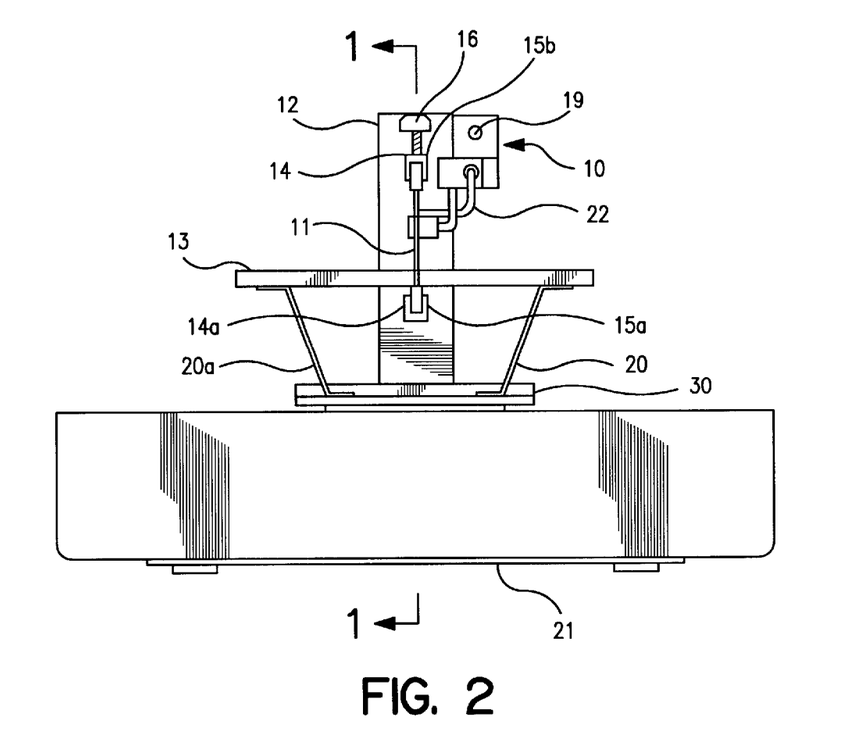
FIG. 2 is a front plan view thereof.
Figure 3:
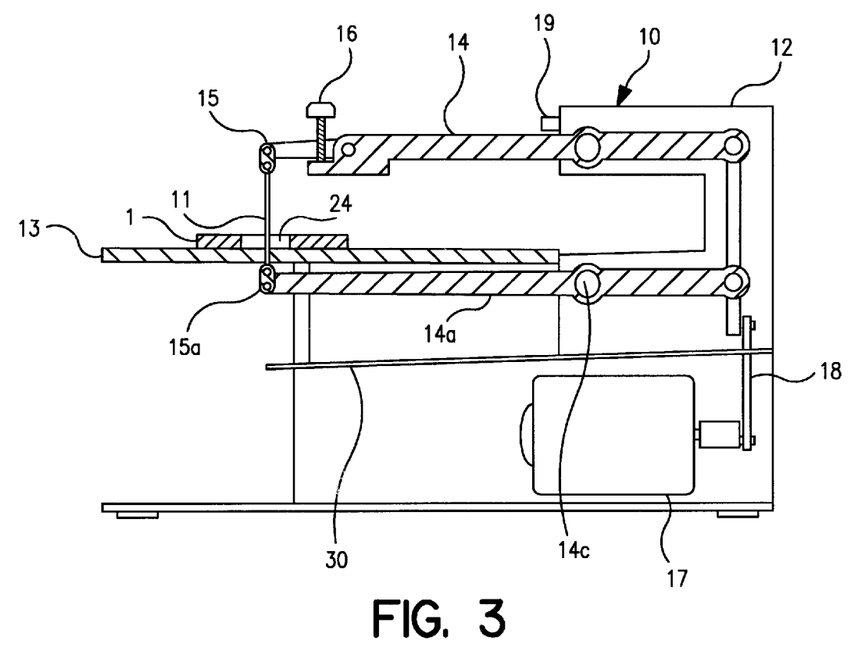
FIG. 3 is a cross sectional view of novel vertical blade saw assembly for ceramic and masonry materials, taken along line 1—1 of FIG. 2.

The vertical saw blade assembly 10 as shown in FIGS. 1, 2, and 3 has many advantageous over prior tile cutting systems. Prior cutting systems, like the one disclosed in the Raczkowski patent, use a rotary wheel to cut the tile. The rotary wheel is best suited for making straight cuts along tile and not irregular cuts such as radiuses and holes.

Figure 7A:
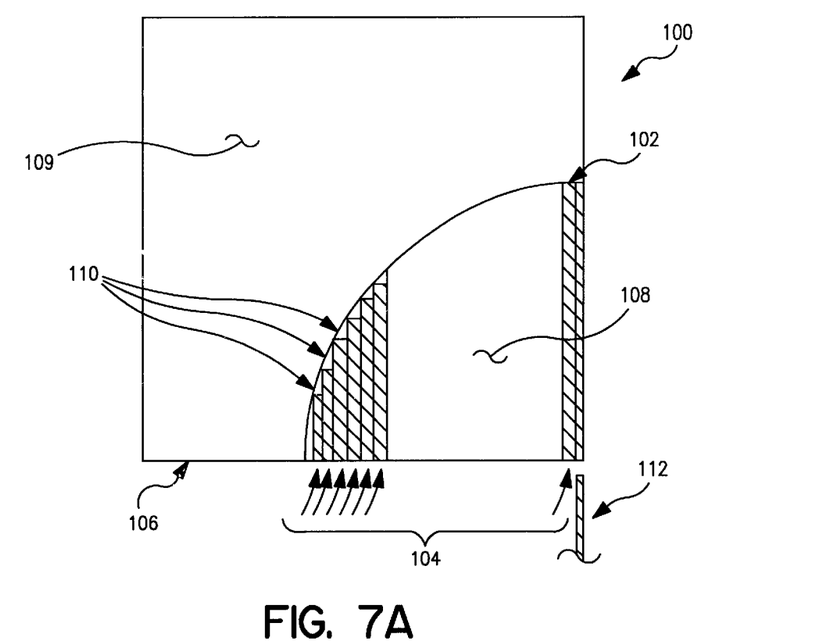
FIGS. 7A, 7B, and 7C show a process for cutting curved shapes out of tile, ceramic tile, masonry, glass, brick, concrete, marble, and stone.

FIG. 7 shows how to cut an arc 102 on a tile 100 using prior systems to end up with a desired section 109. The user must make numerous cuts 104 from the edge 106 of the tile 100 to the arc 102 in order to remove the unwanted section 108. The number of cuts is dictated by the size of the arc and the experience of the user. Even after completing this time consuming task, the user must remove the small, unwanted tile pieces 110 in order to make a smooth arc. A smooth arc is very important especially when an artisan is making a mural or the like and needs tiles of different color or texture to mate neatly to form the piece of art. The process of cutting tiles with the rotary saw always results in the destroying of the section 108 of tile 100. Certain artistic patterns could benefit from the reuse of the section 108. The section 108 of tile 100 could be reused if cut according to the present invention as will be described below, but not if cut using the method shown in FIG. 7A. These wasted sections 108 are costly due to the time required to cut them and the fact that they are destroyed during the cutting process.

Figure 7B:
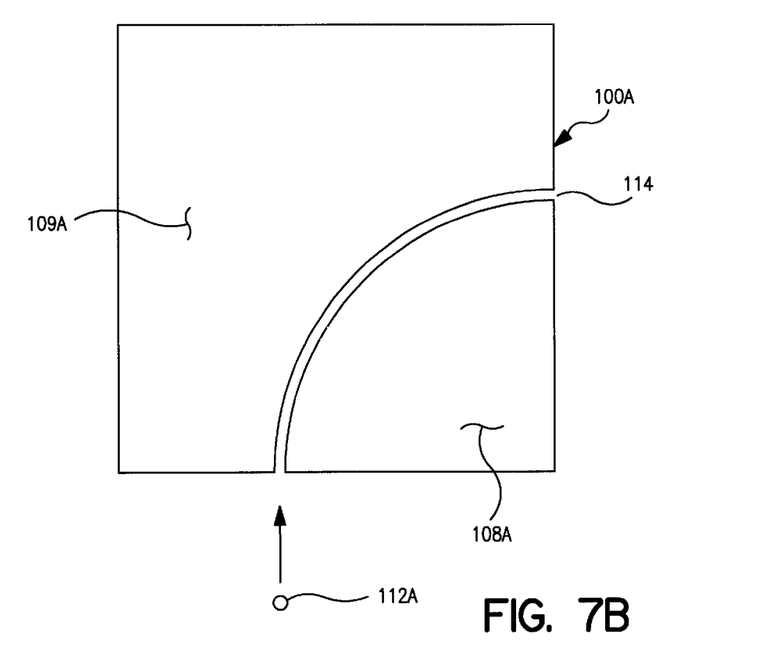

FIG. 7B shows how a tile 100A can be cut into two useable sections 108A and 109A. The vertically reciprocating blade 112A cuts a narrow path 114 through the tile 100A. The width of the cut is dictated by the width of the blade 112A.

Figure 7C:
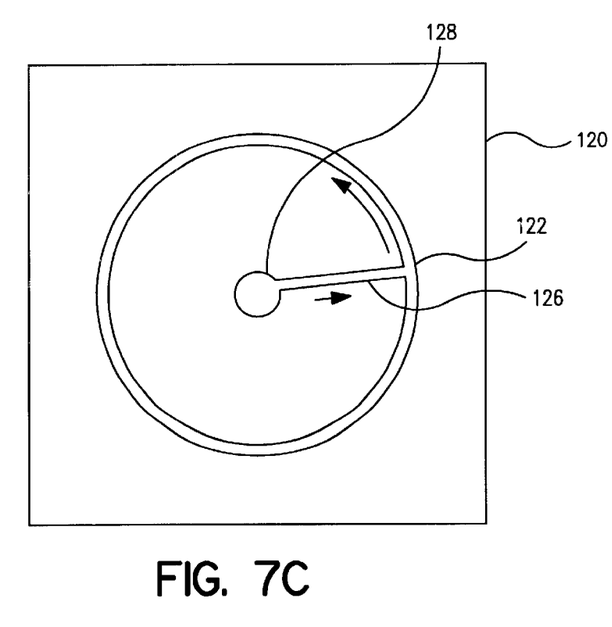

FIG. 7C shows how to cut a shape 122 in a piece of tile 120. The shape is shown as a circle, although any shape is achievable. The shape 122 as shown does not extend to the borders of the tile 120. The first step is to form an opening 128 through the tile 120 with an appropriate drill bit or by plunge cutting the tile from the back side of the tile. The size of the opening 128 must be large enough to allow the blade 11 to extend therethrough. The opening 128 can be placed anywhere within the border of the shape 122. The next step is to disconnect the blade 11 from the reciprocating blade arms 14 and 14A, feed the blade 11 through the opening 128, and then reconnect the blade 11 back to the reciprocating blade arms 14 and 14A. The saw blade assembly 10 is then turned on and a slot 126 is cut from the edge of the opening 128 to the edge of the shape 122. The cutting is then continued along the inside edge of the shape 122. This cutting process allows for an insert to be added without having to make a cut that extends to the outside edge of the tile 120. This type of cut cannot be made with a band saw because the band saw has a continuous blade.

Figure 8:
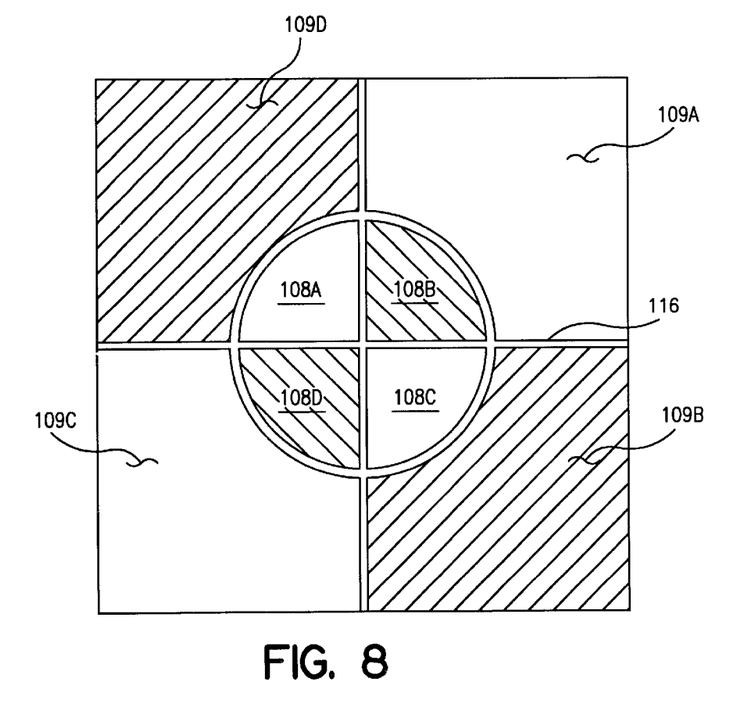
FIG. 8 is a pattern formed from the pieces from FIG. 7B.

FIG. 8 shows how the tiles from FIG. 7B can be arranged to present interesting patterns without wasting any tile. The angled lines are used to show differences in either color or texture of the tiles 100. The narrow section 114 removed from the tile 100A with the blade 112A can be filled with a grout 116.

Another advantage of the present invention is that an artisan can stack two or more tiles on top of each other for cutting. This concurrent cutting saves time and ensures the pieces will mate together nicely.

Figure 9:
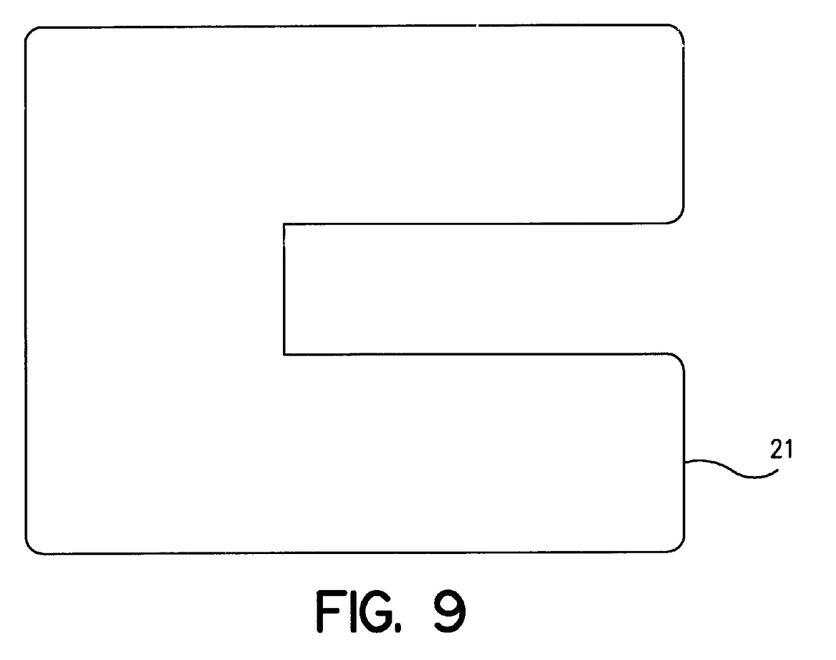
FIG. 9 is a top view of the reservoir of FIG. 1.

The coolant reservoir 21 as shown in FIG. 9 is "U" shaped to fit around the lower part of the saw blade assembly 10. The bottom of the reservoir 21 rests on the base of the saw. The reservoir 21 is preferably removable to make cleaning and transportation easier.

Figure 10:
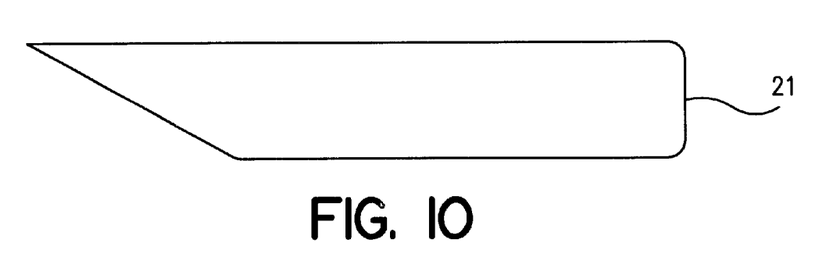
FIG. 10 is a side view of an alternative embodiment of the reservoir of FIG. 1.

As shown in FIG. 10, the front portion of the coolant reservoir 21 may be inclined to encourage the coolant to flow towards the pump 23 which is located towards the back of the reservoir 21 and to decrease the amount of coolant required.

Figure 11:
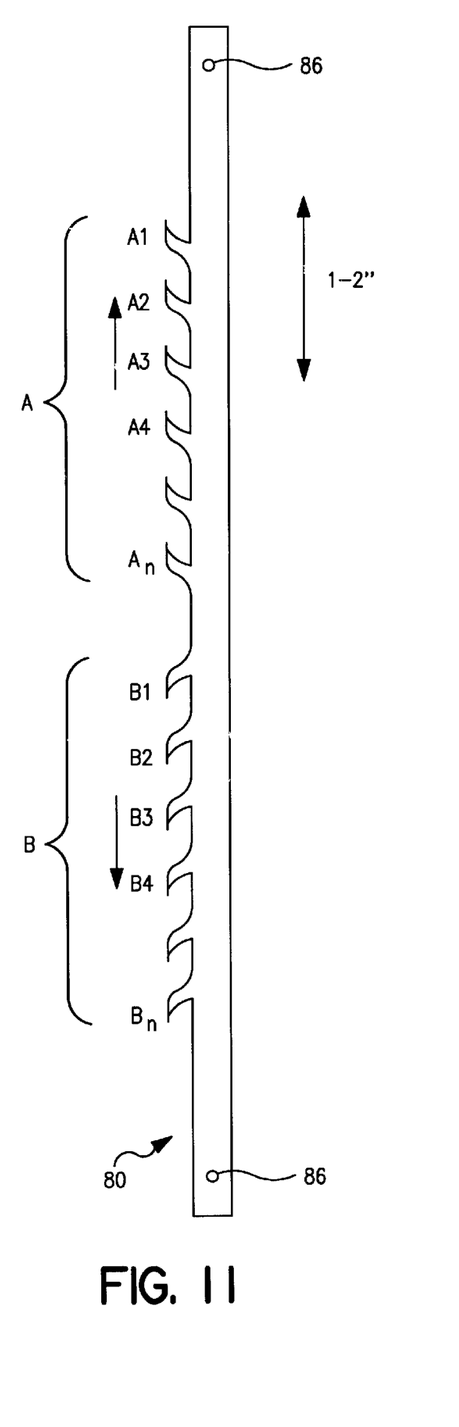
FIG. 11 is a side view of a forth embodiment of a cutting blade according to the present invention.

FIG. 11 shows a blade 80 having a first cutting area "A" and a second cutting area "B". The blade 80 has teeth or cutting surfaces A1–An and B1–Bn. The quantity of teeth or cutting surfaces depends on the length of the blade 80 and the number of teeth or cutting surfaces per inch of blade. The design shape of the teeth or cutting surfaces can be adjusted depending on the type of material being cut. Different teeth or cutting surface designs are well known in the art. The teeth or cutting surfaces A1–An are directionally oriented to facilitate cutting predominantly in a first direction. The teeth or cutting surfaces B1–Bn are directionally oriented to facilitate cutting predominantly in a second direction. This effectively gives the user two cutting sections. Once the first cutting section is worn, the user simply flips the blade over and starts using the second cutting section. This has the benefit of having a blade that last twice as long as previous blades. At each end of the blade 80 is a hole or pin 86 for securing the blade 80 to reciprocating blade arms 14 and 14a.

The reciprocating arms 14 and 14a of the saw assembly 10 cause the blade 11 to reciprocate in a substantially linear path approximately 1–2" in length. If, as is shown in FIGS. 1, 2, and 3, one of the reciprocating arms (14a) is closer to the work table 13 than the other (14), the blade 11 will be worn on one end and not on the other end. To cut using the blade 80, the user simply installs the blade 11 in to the saw assembly 10 and begins to cut. When the teeth in section of the blade 80 being used get worn, the user simply removes the blade, turns it up side down, and starts cutting with the unused section.

Figure 12:
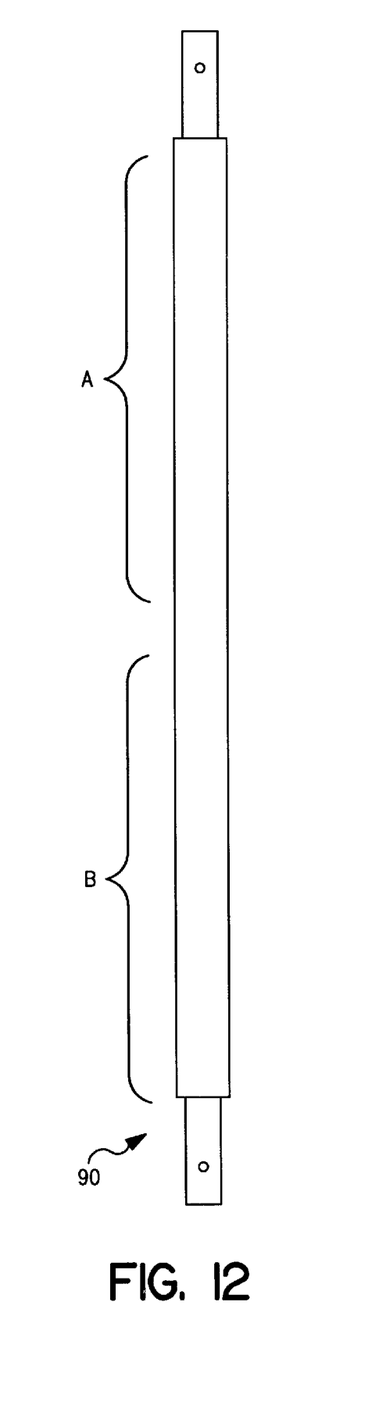
FIG. 12 is a side view of a fifth embodiment of a cutting blade according to the present invention.

FIG. 12 shows a blade 90 for cutting tile, ceramic tile, masonry, glass, brick, concrete, marble, and stone. Like the blade in FIG. 11, the blade 90 has a first cutting section "A" and a second section "B". In this embodiment, the teeth or cutting surfaces are made of Tungsten Carbide or diamond. Each section "A" and "B" has the teeth or cutting surfaces directionally oriented to facilitate cutting predominantly in one direction. A rod saw similar to the one shown in FIG. 4 can be made with sections having teeth or cutting surfaces directionally oriented to facilitate cutting predominantly in one direction.

Figure 13:
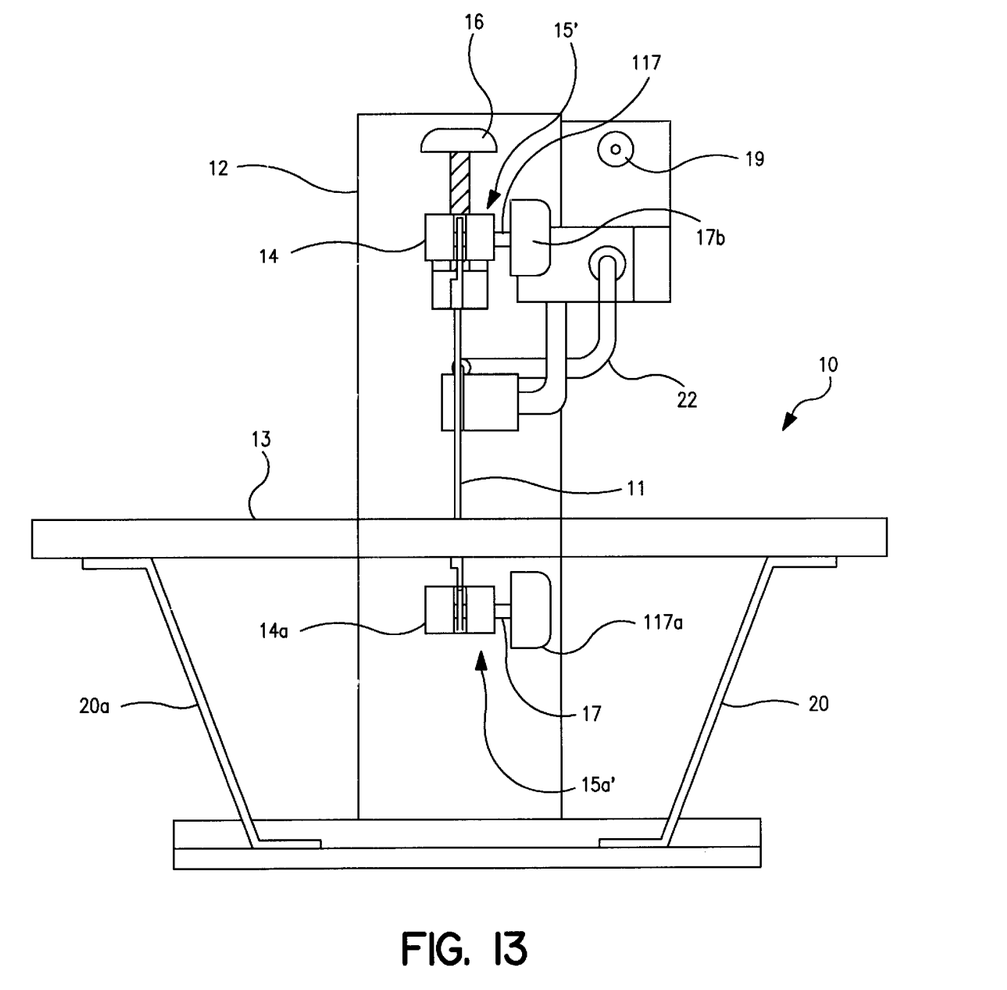
FIG. 13 is a front view of a preferred embodiment attachment method for securing a blade to a reciprocating arm.

FIG. 13 shows a front view of a preferred embodiment attachment method for coupling the blade 11 to the reciprocating arm 14. A pin 117, having a knob 117b secured to one end, is inserted through the linking mechanism 15' and a hole in the top end of the blade 11. A similar attachment method secures the lower end of the blade 11 to the linking mechanism 15a'. This attachment method helps reduce the amount of deflection of the blade 11 when the blade 11 is urged upward and downward by the reciprocating arms 14 and 14a.

While I have described my invention in connection with specific embodiments thereof, it is clearly to be understood that this is done only by way of example and not as a limitation to the scope of my invention as set forth in the objects thereof and in the appended claims.

I claim:

1. A vertical blade saw assembly for ceramic and masonry materials, for use in providing precision cuts of any shape to tiles and the like while keeping the blade making the cut within a temperature range in order to prolong the life of the blade, comprising:

a housing;

said housing having a materials support platform for positioning the ceramic and masonry materials to be cut;

said housing having a plurality of blade attaching arms for holding a blade in the proper orientation;

a vertical blade unit attached to said blade attaching arms for cutting the material;

a coolant system for maintaining said blade at a desired temperature in order to prolong the operational life of said blade;

a drive motor for operating said blade attaching arms and said vertical blade unit; and a diverter for diverting coolant away from said drive motor.

2. The vertical blade saw assembly of claim 1, wherein said housing comprises a unit of rigid construction.

3. The vertical blade saw assembly of claim 1, wherein said housing further comprises a unit of metallic construction.

4. The vertical blade saw assembly of claim 1, wherein said housing further comprises a unit of composite construction.

5. The vertical blade saw assembly of claim 1, wherein said materials support platform comprises a flat platform upon which the material to be cut is positioned;

said flat platform having an aperture positioned therein for allowing said vertical blade to pass through to facilitate the cutting of materials.

6. The vertical blade saw assembly of claim 1, wherein said blade attaching arms comprise means positioned above and below said vertical blade unit;

said blade attaching arms further having linkage means for attaching said blade attaching arms to said drive motor; and said blade attaching arms further having pivot means to facilitate parallel, oscillating motion to said blade attaching arms and thereby transferring said motion to said vertical blade unit.

7. The vertical blade saw assembly of claim 1, wherein said vertical blade unit having means for attaching and releasing said vertical blades from said vertical blade unit; and said vertical blade unit further having a tensioning means for loosening or tightening said vertical blade unit.

8. The vertical blade saw assembly of claim 1, wherein said coolant system comprises a coolant holding tank located around said housing of said materials support unit for providing a reservoir for the coolant and to receive said coolant after it passes over said blade unit;

said coolant system further comprises a pump unit for providing a source for driving said coolant to said blade; and said coolant system further comprises a tubing means for directing said coolant from said coolant holding tank to said blade.

9. The vertical blade saw assembly of claim 1, wherein said drive motor comprises an electric unit for operating said blade attaching arms and said vertical blade;

said drive motor having an on and off switch.

10. The vertical blade saw assembly of claim 1, wherein the coolant comprises water.

11. The vertical blade saw assembly of claim 1, wherein the vertical blade unit comprises a first end and a second end, at least one of the ends capable of being inserted through a hole in the material.

12. The vertical blade saw assembly of claim 1, wherein the vertical blade unit is urged to move in a reciprocating motion by said drive motor.

13. A vertical blade saw assembly for ceramic and masonry materials, for use in providing precision cuts of any shape to tiles and the like while keeping the blade making the cut within a temperature range in order to prolong the life of the blade, comprising:

a housing, said housing having a materials support platform for positioning the ceramic and masonry materials to be cut;

said housing having a plurality of blade attaching arms for holding a blade in the proper orientation, each blade attaching arm being pivotally coupled to the housing about a pivot point, the pivot point located on each arm between a first end and a second end;

a vertical blade unit for cutting the material, the vertical blade unit coupled to said blade attaching arms at said first end;

a coolant system for maintaining said blade at a desired temperature in order to prolong the operational life of said blade;

a drive motor for operating said blade attaching arms and said vertical blade unit, said drive motor being coupled to said blade attaching arms at said second ends; and a diverter for diverting coolant away from said drive motor.

14. The vertical blade saw assembly of claim 13, wherein the coolant comprises water.

15. The vertical blade saw assembly of claim 13, further comprising a linkage to couple said drive motor to said blade attaching arms.

* * * * *